United States Patent [19]

Wright et al.

[11] Patent Number: 4,974,410
[45] Date of Patent: Dec. 4, 1990

[54] INVERTED FLIGHT VALVE

[75] Inventors: Thomas A. Wright; Keith A. Miedema, both of Indianapolis, Ind.

[73] Assignee: General Motors Corporation, Detroit, Mich.

[21] Appl. No.: 319,506

[22] Filed: Mar. 6, 1989

[51] Int. Cl.[5] .............................................. F02C 7/06
[52] U.S. Cl. .................................. 60/39.08; 184/6.2; 184/6.11; 137/38
[58] Field of Search ............... 60/39.08; 184/6.2, 6.11, 184/66, 74, 76; 137/38

[56] References Cited

U.S. PATENT DOCUMENTS

| 2,022,898 | 12/1935 | Niven | 184/6.2 |
| 2,239,098 | 4/1941 | Hunter | 184/6.2 |
| 2,245,198 | 6/1941 | Hunter et al. | 184/6.2 |
| 2,831,490 | 4/1958 | Simcock | 137/38 |
| 2,933,095 | 4/1960 | Rumsey | 137/38 |
| 4,117,907 | 10/1978 | Lechler | 184/6.2 |
| 4,531,358 | 7/1985 | Smith | 60/39.08 |

Primary Examiner—Louis J. Casaregola
Attorney, Agent, or Firm—Saul Schwartz

[57] ABSTRACT

An inverted flight valve between a scavenge pump intake and bottom and top drains of an oil sump in an engine of an aircraft having inverted flight capability, the valve including a valve body with a closed bore therein, a main port in the bore connected to the scavenge pump intake, first and second ports in the bore on opposite sides of the main port and connected to the bottom and top drains, a pair of valve seats in the bore between the main port and respective ones of the first and second ports, and a valve spool having lands at opposite ends slidable in the bore. The valve spool slides in the bore under the influence of gravity between a first position in non-inverted flight wherein one land seats on one of the valve seats to seal the top drain and a second position in inverted flight wherein the other land seats on the other valve seat to seal the bottom drain. Closed chambers defined in the bore at opposite ends of the valve spool are connected by a cross-over passage and orifice-like gas leak paths are defined between the valve bore and each of the valve lands. The combination of the cross-over passage and gas leak paths yields good valve response and good valve stability during inverted flight.

3 Claims, 1 Drawing Sheet

INVERTED FLIGHT VALVE

FIELD OF THE INVENTION

This invention relates to oil scavenging systems in engines on aircraft having inverted flight capability.

BACKGROUND OF THE INVENTION

In aircraft propulsion engines, particularly gas turbine engines, it is common practice to continuously scavenge lubricating oil from sumps of the engine to which the oil drains by gravity after its lubrication function is accomplished. For non-inverted flight, an intake of a scavenge pump is typically connected to a drain at the bottom of the sump. If the aircraft has inverted flight capability, it is necessary to scavenge oil during inverted flight so as to avoid having too much oil in the sump when the aircraft resumes its normal flight attitude. The prior practice of equipping engines with multiple scavenge pumps connected to various sump locations is effective but unattractive for small engine applications where the weight penalty of multiple pumps is significant. An inverted flight valve according to this invention alternately connects a scavenge pump intake to respective ones of a pair of sump drains arranged for scavenging oil in non-inverted and in inverted flight so as to avoid the weight penalty of a second scavenge pump.

SUMMARY OF THE INVENTION

This invention is a new and improved inverted flight valve in a propulsion engine for an aircraft having inverted flight capability which valve is gravity motivated and quick operating in accordance with the attitude of the aircraft. The inverted flight valve according to this invention includes a valve body on the engine having a valve bore oriented vertically in both non-inverted and inverted flight, a main port generally at the longitudinal center of the bore, first and second ports on opposite sides of the main port connected to respective ones of first and second sump drains at the bottom and top of the engine oil sump, and first and second annular valve seats between the main port and the first and second ports. A valve shuttle or spool in the valve bore has a pair of valve lands connected by a reduced shank. The valve lands seat on respective ones of the valve seats depending on the attitude of the aircraft to alternately disconnect either the first or the second port from the main port. Variable volume end chambers are defined in the bores at opposite ends of the valve spool which expand and contract as the spool moves between its first and second positions. The variable volume end chambers are connected by a cross-over passage which shuttles gas between the expanding and contracting ones of the end chambers. The gas leakage paths defined around the big lands on the valve spool cooperate with the cross-over passage between the end chambers to yield a unique combination of valve spool stability in non-inverted flight and rapid valve changeover at the onset of inverted flight.

DESCRIPTION OF A PREFERRED EMBODIMENT

Figure 1:
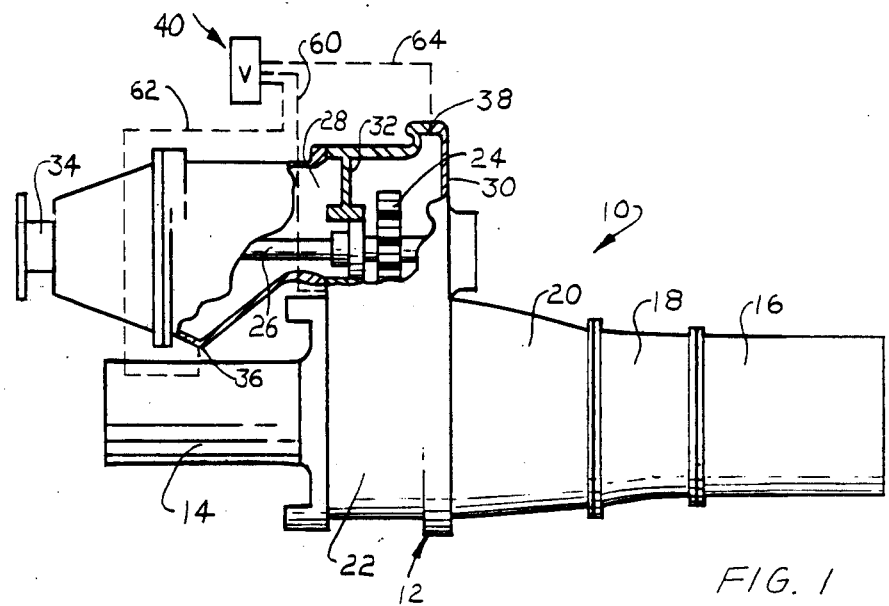
FIG. 1 is a partially schematic, partially broken away elevational view of an aircraft propulsion gas turbine engine having an inverted flight valve according to this invention.

Referring to FIG. 1 of the drawings, an aircraft propulsion gas turbine engine 10, such as a Model 250-B17D manufactured by the Allison Gas Turbine Division, General Motors Corporation, Indianapolis, Indiana 46206 has a case 12. The case 12 includes a compressor section 14 at one end, a reverse flow combustor section 16 at the other end, a turbine section 18 adjacent the combustor section, an exhaust section 20 adjacent the turbine section, and a gear box 22. The gear box houses a plurality of reduction gears which transfer power from a power turbine shaft of the engine, not shown, to a spur gear 24 on a shaft 26 of the engine. The shaft 26 is rotatably supported in a chamber 28 of the case 12 by bearings, not shown, on a back wall 30 of the chamber and on a web 32 of the case. The shaft 26 is connected to a propeller shaft 34 through a planetary gear set, not shown, at the front of the chamber 28.

The chamber 28 defines an oil sump for collecting lubricating oil after the oil has performed it lubricating function. The sump has a first drain 36 and second drain 38. The second drain 36 is located at the bottom of the sump when the engine is oriented for usual non-inverted flight, FIG. 1. The second drain 38 is located at the top of the sump in the non-inverted flight attitude of the engine. In the inverted flight attitude of the engine, not shown, the first drain 36 is at the top of the sump and the second drain 38 is at the bottom of the sump. The engine 10 has a conventional scavenge pump, not shown, for collecting oil from the chamber 28 and returning the same to a reservoir. An inverted flight valve 40 according to this invention is disposed between the scavenge pump and the drains 36, 38 to alternately connect one or the other of the drains to the intake of the pump in accordance with the flight attitude of the aircraft.

Figure 2:
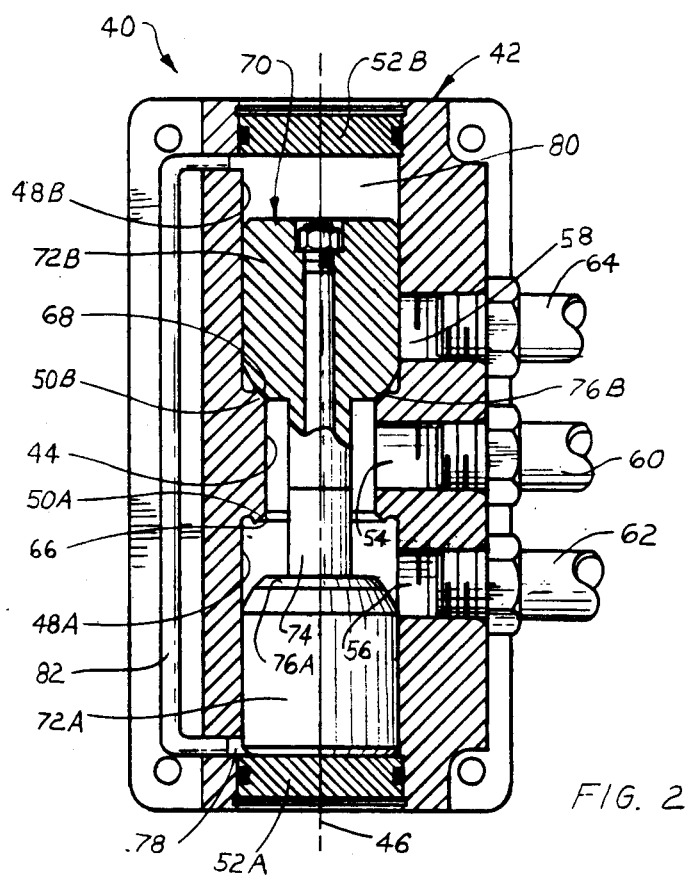
FIG. 2 is an enlarged sectional view of a portion of FIG. 1 showing the inverted flight valve according to this invention.

Referring to FIGS. 1 and 2, the inverted flight valve 40 includes a valve body 42 adapted for rigid attachment to the case 12 of the engine or to the airframe of the aircraft. The valve body 42 has a small diameter cylindrical bore 44 therein aligned on an axis 46 of the valve body. The axis 46 is vertical in both the non-inverted and in the inverted flight attitudes of the aircraft. The small diameter bore 44 opens at opposite ends into respective ones of a pair of large diameter bores 48A-B in the valve body also aligned on the axis 46. The bore 48A terminates at an annular shoulder 50A of the valve body and the bore 48B terminates at a similar annular shoulder 50B. The bore 48A is closed by a first cover 52A and the bore 48B is closed by a second cover 52B.

The valve body has a main port 54 therein which intersects the small diameter bore 44 between the annular shoulders 50A-B. The valve body also has a first port 56 intersecting the large diameter bore 48A between the annular shoulder 50A and the first cover 52A and a second port 58 intersecting the large diameter bore 48B between the annular shoulder 50B and the second cover 52B. The main port 54 is connected by a duct 60 to the intake of the scavenge pump. The first port 56 is connected by a duct 62 to the first drain 36. The second port 58 is connected by a duct 64 to the second drain 38. A first frustoconical valve seat 66 is defined on the annular shoulder 50A facing the first end cover 52A between the main port 54 and the first port 56. A second frustoconical valve seat 68 is defined on the annulus shoulder 50B facing the second end cover 52B between the main port 54 and the second port 58.

The inverted flight valve 40 further includes a valve element or spool 70. The valve spool has a cylindrical first land 72A at one end slidable in bore 48A, a cylindrical second land 72B at the opposite end slidable in bore 48B, and a reduced diameter shank 74 connecting the big lands. The first land 72A has a frustoconical seat 76A facing the valve seat 66 and the second land 72B has a frustoconical seat 76B facing the valve seat 68. A first variable volume end chamber 78 is defined at one end of the valve spool between the first land 72A and the first end cover 52A. A second variable volume end chamber 80 is defined at the other end of the valve spool between the second land 72B and the second end cover 52B. A crossover passage 82 between the end chambers 78 and 80 defines a gas path between the chambers.

The diameters of the first and second lands 72A-B are generally equal to the diameters of the bores 48A-B but sufficiently smaller to allow a free sliding fit of the lands in the bores so that the valve spool 70 is bodily shiftable under the influence of gravity. For example, a radial clearance of on the order of 0.001 inches between the lands 72A-B and the large diameter bores 48A-B is acceptable. The spool has a first position, FIG. 2, corresponding to non-inverted flight wherein the valve seat 76B on the second land 72B seats on the valve seat 68 on the valve body. The spool has a second position, not shown, corresponding to inverted flight wherein the valve seat 76 on the valve land 72A on the seat 66 on the valve body.

The inverted flight valve 40 operates as follows. With the aircraft in normal, non-inverted flight, the valve spool 70 assumes its first position. The small diameter bore 44 is maintained at subatmospheric pressure by the scavenge pump intake. The engaging valve seats 68 and 76B separate the main port 54 from the second port 58 while the first port 56 is open to the main port. Accordingly, the sump chamber 28 of the engine is scavenged through the first drain 36 while the second drain 38 is effectively sealed. The clearance fit between the valve land 72A and the large diameter bore 48A defines an orifice-like gas leak path between the first end chamber 78 and the main port 54.

At the onset of inverted flight, gravity motivates the valve spool 70 from its first position to its second position, not shown. In the second position, the valve seats 66 and 76A engage to isolate first port 56 from the main port 54. Concurrently, the seat 76B on valve land 72B separates from valve seat 68 to open a flow path between the main port 54 and the second port 58. Accordingly, the sump chamber 28 of the engine is scavenged through the second drain 38 while the first drain 36 is effectively sealed. The clearance fit between the valve land 72B and the large diameter bore 48B defines an orifice-like path between the second end chamber 80 and the main port 54.

The crossover passage 82 and the orifice-like gas leak paths defined between the lands 72A-B and the bores 48A-B are important features of this invention. More particularly, tests have demonstrated that with the end chambers isolated from each other and vented only by passages through the valve lands 72A-B to the main port 54, gravity induced movement of the valve spool is unacceptably sluggish and that the valve spool is subject to unseat during turbulent non-inverted flight. However, when the end chambers 78 and 80 are cross connected only by the crossover passage 82 and otherwise isolated from the main port 54 except for the orifice-like gas paths defined between the valve lands 72A-B and the bores 48A-B, gravity induced movement of the valve spool between its first and second positions is acceptably rapid and the spool exhibits superior stability during turbulent non-inverted flight.

The embodiments of the invention in which in exclusive property or privilege is claimed are defined as follows:

1. In an engine for an aircraft having inverted flight capability, said engine including a scavenge pump for scavenging oil from a sump of said engine through a first drain during non-inverted flight and through a second drain during inverted flight, an inverted flight valve comprising:

a valve body attached to one of said engine and said aircraft, means defining a valve bore in said valve body closed at opposite ends and aligned on an axis of said engine oriented vertically in non-inverted flight and in inverted flight, a valve spool having a first land slidable in said bore and a second land slidable in said bore and a reduced shank therebetween and bodily shiftable under the influence of gravity between a first position corresponding to non-inverted flight and a second position corresponding to inverted flight, said first land cooperating with a first closed end of said valve bore in defining a first variable volume end chamber at one end of said valve spool and said second land cooperating with a second closed end of said valve bore in defining a second variable volume end chamber at the other end of said valve spool, means defining a main port in said valve body connected to an intake of said scavenge pump and to said valve bore between said first and said second valve lands in each of said first and said second positions of said valve spool, means defining a first port in said valve body connected to said first drain and to said valve bore between said main port and said first closed end of sais valve bore, means defining a second port in said valve body connected to said second drain and to said valve bore between said main port and said second closed end of said valve bore, means defining a first seat in said bore between said main port and said first port and engageable by said first land in said second position of said valve spool to define a seal between said first port and said main port, means defining a second valve seat in said bore between said main port and said second port and engageable by said second land in said position of said valve spool to define a seal between said second port and said main port, and means defining a passage continuously fluid connecting said first variable volume end chamber and said second variable volume end chamber, the sliding interfaces between said valve bore and each of said first and said second valve lands defining an orifice-like gas leak path between the one of said first and said second ports communicating with said main port and the corresponding one of said first and said second variable volume end chambers.

2. The inverted flight valve recited in claim 1 wherein said valve bore is a cylindrical bore and each of said first and said second valve lands is a cylindrical land having a diameter less than the diameter of said valve bore whereby said gas leak paths are defined in the annuli between said valve bore and said first and said second lands.

3. The inverted flight valve recited in claim 2 wherein said first valve seat in said valve bore is a frustoconical surface on a first annular shoulder of said valve body, and said second valve seat in said valve bore is a frustoconical surface on a second annular shoulder of said valve body.

* * * * *